United States Patent
Sakitani et al.

(10) Patent No.: US 9,620,758 B2
(45) Date of Patent: Apr. 11, 2017

(54) NONAQUEOUS ELECTROLYTE SECONDARY BATTERY

(75) Inventors: Nobuhiro Sakitani, Hyogo (JP); Takanobu Chiga, Osaka (JP); Hiroyuki Fujimoto, Hyogo (JP)

(73) Assignee: SANYO Electric Co., Ltd., Daito-shi, Osaka (JP)

(*) Notice: Subject to any disclaimer, the term of this patent is extended or adjusted under 35 U.S.C. 154(b) by 398 days.

(21) Appl. No.: 14/123,328

(22) PCT Filed: May 10, 2012

(86) PCT No.: PCT/JP2012/061976
§ 371 (c)(1),
(2), (4) Date: Dec. 2, 2013

(87) PCT Pub. No.: WO2013/001919
PCT Pub. Date: Jan. 3, 2013

(65) Prior Publication Data
US 2014/0093767 A1    Apr. 3, 2014

(30) Foreign Application Priority Data

Jun. 30, 2011    (JP) .................................. 2011-146716

(51) Int. Cl.
*H01M 2/16* (2006.01)
*H01M 10/0565* (2010.01)
(Continued)

(52) U.S. Cl.
CPC ........... *H01M 2/1686* (2013.01); *H01M 4/13* (2013.01); *H01M 4/62* (2013.01); *H01M 4/622* (2013.01);
(Continued)

(58) Field of Classification Search
CPC .......................... H01M 4/366; H01M 10/0565
(Continued)

(56) References Cited

U.S. PATENT DOCUMENTS

2005/0042515 A1*  2/2005  Hwang ................... H01M 4/13
                                                         429/231.95
2005/0095504 A1   5/2005  Kim et al.
(Continued)

FOREIGN PATENT DOCUMENTS

CN          1851957 A       10/2006
JP       2005-142156 A       6/2005
(Continued)

OTHER PUBLICATIONS

Office Action dated May 29, 2015, issued in counterpart Chinese application No. 201280032345.4 (6 pages).
(Continued)

*Primary Examiner* — Basia Ridley
*Assistant Examiner* — James Erwin
(74) *Attorney, Agent, or Firm* — Westerman, Hattori, Daniels & Adrian, LLP

(57) ABSTRACT

To realize high capacity of batteries, an object of the invention is to provide nonaqueous electrolyte secondary batteries which are unlikely to become swollen when charged to a high voltage and allowed to stand in a high temperature atmosphere. The nonaqueous electrolyte secondary battery includes a positive electrode including a positive electrode active material, a negative electrode including a negative electrode active material, a nonaqueous electrolyte, and a separator disposed between the positive electrode and the negative electrode. An inorganic particle layer is disposed between the positive electrode and the separator or between the negative electrode and the separator. The inorganic particle layer contains a polymer with a polyethylene glycol group. The polymer with a polyethylene glycol group has an average molecular weight of not less than 200.

15 Claims, 1 Drawing Sheet

(51) Int. Cl.
  *H01M 10/05* (2010.01)
  *H01M 4/13* (2010.01)
  *H01M 4/62* (2006.01)
  *H01M 10/058* (2010.01)
  *H01M 4/36* (2006.01)
  *H01M 10/0525* (2010.01)

(52) U.S. Cl.
  CPC ......... *H01M 10/05* (2013.01); *H01M 10/058* (2013.01); *H01M 10/0565* (2013.01); *H01M 4/366* (2013.01); *H01M 10/0525* (2013.01)

(58) Field of Classification Search
  USPC ....................................................... 429/144
  See application file for complete search history.

(56) References Cited

U.S. PATENT DOCUMENTS

2010/0188048 A1* 7/2010 Nishino ................ H01M 2/166
                                                                 320/120
2010/0273045 A1* 10/2010 Hasegawa ............... H01M 2/14
                                                                 429/163
2011/0091774 A1    4/2011  Wakizaka et al.
2011/0311870 A1   12/2011  Wakizaka et al.

FOREIGN PATENT DOCUMENTS

| | | |
|---|---|---|
| JP | 2009-181756 A | 8/2009 |
| JP | 2011-071047 A | 4/2011 |
| WO | 2009/123168 A1 | 10/2009 |
| WO | 2010/098434 A1 | 9/2010 |

OTHER PUBLICATIONS

International Search Report of PCT/JP2012/061976, mailing date of Aug. 14, 2012.

Office Action dated Mar. 15, 2016, issued in counterpart Japanese Patent Application No. 2013-522517 (3 pages).

* cited by examiner

NONAQUEOUS ELECTROLYTE SECONDARY BATTERY

TECHNICAL FIELD

The present invention relates to nonaqueous electrolyte secondary batteries which have an inorganic particle layer formed between a positive electrode or a negative electrode and a separator.

BACKGROUND ART

In recent years, mobile information terminals such as mobile phones, notebook computers and PDAs are rapidly becoming smaller and more lightweight, and batteries as power supplies for driving these devices are required to be further increased in capacity. Lithium ion batteries, which are charged and discharged by the movement of lithium ions between positive and negative electrodes, have high energy density and high capacity, and are therefore widely used as power supplies for driving mobile information terminals such as those described above.

While the capacity of lithium ion batteries is increased year by year, the batteries tend to become less reliable with increasing capacity. Thus, there is a demand that the batteries be improved in terms of the balance between high capacity and battery characteristics such as reliability.

Patent Literature 1 proposes a positive electrode for nonaqueous electrolyte secondary batteries and a nonaqueous electrolyte secondary battery utilizing the same wherein the positive electrode can suppress the occurrence of low short-circuit current between the positive electrode and a negative electrode and allows storage characteristics at high temperatures to be improved.

CITATION LIST

Patent Literature

PTL 1: Japanese Published Unexamined Patent Application No. 2011-71047

SUMMARY OF INVENTION

Technical Problem

Patent Literature 1 describes that storage characteristics at high temperatures (60° C.) are improved by the addition of a glycol compound to an inorganic particle layer disposed on the surface of the positive electrode. However, a new problem has been encountered in which when the battery is charged to a final charge voltage higher than usual 4.2 V and is allowed to stand in an atmosphere at as high a temperature as 80° C., the positive electrode reacts with an electrolytic solution to generate a gas, which causes the battery to be swollen. Thus, further improvements are necessary to prevent such swelling of batteries.

An object of the present invention is to provide nonaqueous electrolyte secondary batteries which are unlikely to become swollen by the generation of gas from the reaction of a positive electrode and an electrolytic solution even when, for example, the batteries are charged to a final charge voltage higher than usual 4.2 V and are allowed to stand in an atmosphere at as high a temperature as 80° C.

Solution to Problem

The present invention is directed to a nonaqueous electrolyte secondary battery that includes a positive electrode including a positive electrode active material, a negative electrode including a negative electrode active material, a nonaqueous electrolyte, and a separator disposed between the positive electrode and the negative electrode and is characterized in that an inorganic particle layer is disposed between the positive electrode and the separator or between the negative electrode and the separator, the inorganic particle layer contains a polymer with a polyethylene glycol group, and the polymer with a polyethylene glycol group has an average molecular weight of not less than 200.

According to this configuration, the polyethylene glycol groups in the inorganic particle layer disposed between the positive electrode and the separator or between the negative electrode and the separator adsorb decomposition products resulting from the decomposition of the electrolytic solution at the positive electrode surface before the decomposition products reach the negative electrode surface, and thereby prevent the decomposition products from arriving at the negative electrode surface to suppress the generation of gas.

If the average molecular weight of the polymer with a polyethylene glycol group is less than 200, the capability of adsorbing the decomposition products is lowered and the effects of the suppression of battery swelling tend to be decreased. If the average molecular weight of the polymer exceeds 2000000, the solubility in a slurry solvent is decreased. Consequently, it is probable that the inorganic particle layer cannot be produced uniformly on the surface of the positive or negative electrode or the surface of the separator, thus deteriorating productivity.

It is particularly preferable that the polymer with a polyethylene glycol group present in the inorganic particle layer have an average molecular weight of not less than 1000 and not more than 20000.

The inorganic particle layer in the invention is preferably disposed between the positive electrode and the separator. The reason for this is that decomposition products can be adsorbed more effectively by the formation of the inorganic particle layer with respect to the surface of the positive electrode from which the decomposition products are generated.

Further, it is more preferable that the inorganic particle layer be disposed on the surface of the positive electrode. The reason for this is that when the inorganic particle layer is disposed on the surface of the positive electrode, the inorganic particle layer can be prevented from being shrunk together with the separator in the event of heat generation.

Examples of the inorganic particles present in the inorganic particle layer include rutile-type titanium oxide (rutile-type titania), aluminum oxide (alumina), zirconium oxide (zirconia) and magnesium oxide (magnesia). The average particle diameter of the inorganic particles is preferably not more than 1 μm, and more preferably in the range of 0.1 to 0.8 μm. In view of the dispersibility of the inorganic particles in a slurry, it is particularly preferable that the inorganic particles have been surface-treated with aluminum, silicon or titanium. Further, the average particle diameter of the inorganic particles is preferably larger than the average pore diameter of the separator. That is, the average pore diameter of the separator is preferably smaller than the average particle diameter of the inorganic particles. According to the configuration in which the inorganic particles have an average particle diameter larger than the average pore diameter of the separator, the entry of the inorganic particles into the fine pores of the separator is suppressed to make it possible to avoid a consequent decrease in discharge performance. In view of safety in batteries, namely, the reactivity with lithium as well as costs, aluminum oxide and rutile-type titanium oxide are particularly preferable as the inorganic particles.

The thickness of the inorganic particle layer disposed on the surface of the positive electrode is preferably not more than 4 μm, more preferably in the range of 0.5 to 4 μm, and still more preferably in the range of 0.5 to 2 μm. If the thickness of the inorganic particle layer is excessively small, the formation of the inorganic particle layer can sometimes fail to provide sufficient effects. Forming the inorganic particle layer in an excessively large thickness causes a risk that the load characteristics and the energy density of batteries may be decreased.

Examples of the polymers with a polyethylene glycol group used in the present invention include polyethylene glycols such as polyethylene glycol #1000 and polyethylene glycol #6000, polyethylene glycol monoalkyl ethers such as polyethylene glycol monomethyl ether, polyethylene glycol acyl esters such as polyethylene glycol monosuccinates (half ester-half carboxylic acid compounds) with specific examples including polyethylene glycol monomethyl ether or polyethylene glycols terminated with maleates on both ends (half ester-half carboxylic acid compounds), and compounds obtained by reacting a glycidyl group-containing compound such as ethylene glycol diglycidyl ether, glycerol triglycidyl ether or sorbitol polyglycidyl ether with a polyethylene glycol such as polyethylene glycol #400 or #600.

Examples of the polymers with a polyethylene glycol group further include compounds obtained by reacting an isocyanate group-containing compound such as MDI or TDI with a compound polyethylene glycol such as polyethylene glycol #400 or #600, and compounds obtained by reacting an oxazoline group-containing compound such as bisoxazoline or 1,3-benzobisoxazoline with a polyethylene glycol such as polyethylene glycol #400 or #600.

Examples of the polymers with a polyethylene glycol group further include compounds obtained by reacting an acid anhydride such as butanetetracarboxylic anhydride or pyromellitic anhydride with a polyethylene glycol such as any described above, and polymers such as homopolymers or copolymers including polyethylene glycol monoallyl ethers as polymer components.

The polymers with a polyethylene glycol group described above may be used singly, or as a mixture of polymers.

The solvent for the nonaqueous electrolyte used in the invention is not particularly limited and may be, for example, any of the solvents conventionally used in nonaqueous electrolyte secondary batteries. Examples include cyclic carbonates such as ethylene carbonate, propylene carbonate, butylene carbonate and vinylene carbonate, chain carbonates such as dimethyl carbonate, methyl ethyl carbonate and diethyl carbonate, ester-containing compounds such as methyl acetate, ethyl acetate, propyl acetate, methyl propionate, ethyl propionate and γ-butyrolactone, sulfone group-containing compounds such as propanesultone, ether-containing compounds such as 1,2-dimethoxyethane, 1,2-diethoxyethane, tetrahydrofuran, 1,2-dioxane, 1,4-dioxane and 2-methyltetrahydrofuran, nitrile-containing compounds such as butyronitrile, valeronitrile, n-heptanenitrile, succinonitrile, glutaronitrile, adiponitrile, pimelonitrile, 1,2,3-propanetricarbonitrile and 1,3,5-pentanetricarbonitrile, and amide-containing compounds such as dimethylformamide. In particular, these solvents in which part of the hydrogen atoms are replaced by fluorine atoms are preferably used.

The solvents may be used singly or in combination with one another. In particular, a combination of a cyclic carbonate and a chain carbonate is preferable as the solvent.

The solute in the nonaqueous electrolytic solution may be, for example, any of the conventional solutes. Examples include $LiPF_6$, $LiBF_4$, $LiN(SO_2CF_3)_2$, $LiN(SO_2C_2F_6)_2$ and $LiPF_{6-x}(C_nF_{2n-1})_x$ [wherein $1<x<6$ and $n=1$ or $2$]. A single solute, or a mixture of two or more kinds of these solutes may be used. The concentration of the solute is not particularly limited, but is desirably 0.8 to 1.8 moles per 1 liter of the nonaqueous electrolytic solution.

The negative electrode used in the invention may be, for example, any of the conventionally used negative electrodes. In particular, examples include carbon materials capable of storing and releasing lithium, or metals capable of forming alloys with lithium or alloys including such metals, and/or such alloy compounds, as well as mixtures of these materials.

Examples of the carbon materials include graphites and cokes such as natural graphite, non-graphitizable carbon and artificial graphite. Examples of the alloy compounds include compounds including at least one metal capable of forming an alloy with lithium. In particular, the element capable of forming an alloy with lithium is preferably silicon or tin. Compounds of these elements with oxygen such as silicon oxide and tin oxide may also be used. Further, mixtures of the carbon materials and silicon or tin compounds may be used.

It is also possible to use other negative electrode materials such as lithium titanate which have a charge/discharge potential versus metallic lithium higher than the above materials such as the carbon materials, although the use of such materials results in a decrease in energy density.

The separator used in the present invention may be, for example, any conventional separator. Specific examples include polyethylene separators, separators in which a polypropylene layer is disposed on the surface of a polyethylene layer, and separators in which the surface of a polyethylene separator is coated with a resin such as an aramid resin.

Advantageous Effects of Invention

Even when the batteries according to the present invention are charged to a final charge voltage higher than usual 4.2 V and are allowed to stand in a high temperature atmosphere, decomposition products generated by the reaction of the positive electrode and the electrolytic solution are effectively adsorbed to the inorganic particle layer, thereby advantageously suppressing the swelling of the batteries.

DESCRIPTION OF EMBODIMENTS

Figure 1:
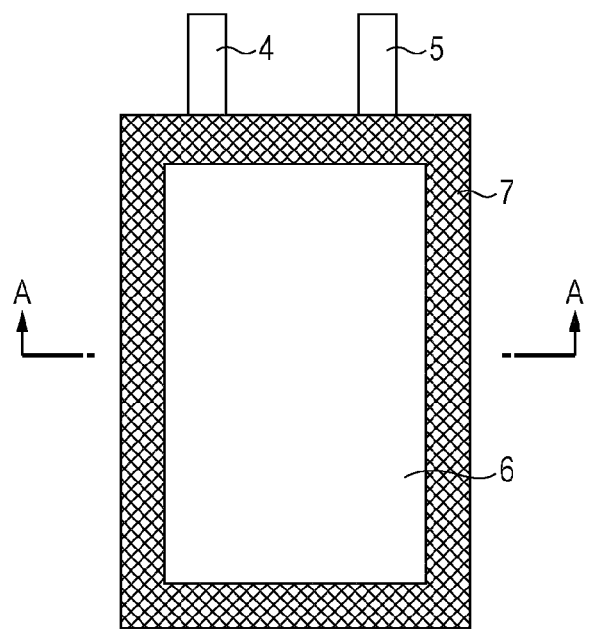
FIG. 1 is a front view of a nonaqueous electrolyte solution secondary battery fabricated in EXAMPLES.

The nonaqueous electrolyte secondary batteries according to the present invention are not limited to the configurations described below and may be modified appropriately without departing from the scope of the invention.

EXAMPLES

Example 1

Fabrication of Positive Electrodes

Lithium cobaltate as a positive electrode active material, acetylene black as a carbon conductive agent, and PVDF (polyvinylidene fluoride) were mixed together in 95:2.5:2.5 by mass. The mixture was mixed together with NMP as a solvent in a mixer to give a positive electrode mixture slurry.

The slurry thus prepared was applied to both sides of aluminum foil and was dried. The foil was then rolled to give a positive electrode. The bulk density of the positive electrode was controlled to 3.60 g/cm$^3$.

<Formation of Inorganic Particle Layers on Positive Electrode Surfaces>

An aqueous slurry for the formation of inorganic particle layers was prepared by adding a polyethylene glycol having an average molecular weight of 200 (product name "Polyethylene Glycol 200" manufactured by Wako Pure Chemical Industries, Ltd.) to components including water as a solvent, titanium oxide ($TiO_2$, average particle diameter: 0.25 μm, without surface treatment layers) as inorganic particles, carboxymethyl cellulose (CMC) as a dispersion stabilizer, and styrene/butadiene rubber (SBR) as an aqueous binder. The solid concentration of the inorganic particles was 30 parts by mass. The dispersion stabilizer was used in 0.2 parts by mass with respect to 100 parts by mass of the inorganic particles. The binder was used in 3.8 parts by mass with respect to 100 parts by mass of the inorganic particles. The polyethylene glycol was used in 1 part by mass with respect to 100 parts by mass of the inorganic particles. The aqueous slurry was applied onto both sides of the positive electrode with a gravure system. Water that was the solvent was removed by drying, thus forming inorganic particle layers on both sides of the positive electrode. The thickness of the inorganic particle layer on each side of the positive electrode was controlled to 2 μm. That is, the total thickness on both sides of the positive electrode was 4 μm.

<Fabrication of Negative Electrodes>

Artificial graphite, a 1 mass % solution of CMC in pure water, and SBR were mixed together in a solid content ratio of 98:1:1 by mass to give a negative electrode slurry. Next, the slurry was applied to both sides of copper foil and was dried, and the foil was rolled such that the bulk density would be 1.60 g/cc, thus fabricating a negative electrode.

<Preparation of Electrolytic Solution>

Ethylene carbonate (EC) and methyl ethyl carbonate (MEC) as nonaqueous solvents were mixed with each other in 30:70 by volume. Thereafter, lithium phosphate hexafluoride ($LiPF_6$) as an electrolyte salt was dissolved in a concentration of 1 M (mol/L). An electrolytic solution was thus prepared.

<Assembly of Batteries>

To constitute a battery, lead terminals were attached to the positive and negative electrodes, and the electrodes were wound into a spiral via a separator (made of polyethylene: film thickness 16 μm, porosity 47%). The unit was pressed to a flat shape. The flattened electrode unit was placed into an aluminum laminate battery exterior case. The electrolytic solution was poured, and the case was sealed. A battery A1 was thus fabricated. The designed capacity of this battery was 850 mAh. For the designed capacity of the battery, designing was performed based on a final charge voltage of 4.40 V.

Figure 2:
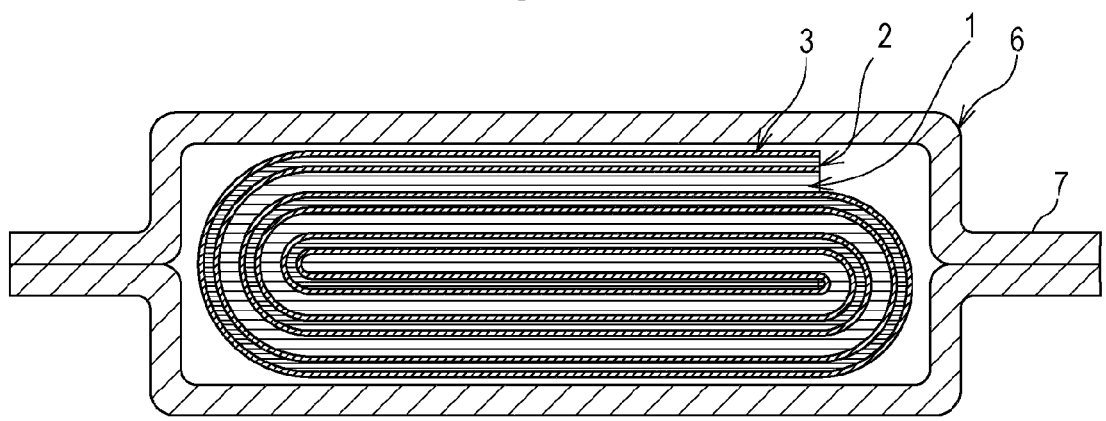
FIG. 2 is a sectional view along arrows A-A in FIG. 1.

The detailed structure of the battery A1 was such that, as illustrated in FIGS. 1 and 2, the positive electrode 1 and the negative electrode 2 were arranged opposite to each other via the separator 3, and the flattened electrode unit consisting of the positive and negative electrodes 1 and 2 as well as the separator 3 was impregnated with the nonaqueous electrolytic solution. The positive electrode 1 and the negative electrode 2 were connected to a positive electrode current collecting tab 4 and a negative electrode current collecting tab 5, respectively, to form a rechargeable, namely, a secondary battery structure. The electrode unit was arranged in a storage space of the aluminum laminate exterior case 6 having a closed section 7 formed by heat sealing of peripheral ends.

Although not illustrated, the inorganic particle layers were disposed on the surfaces of the positive electrode 1.

Example 2

A battery was fabricated in the same manner as in EXAMPLE 1, except that the polyethylene glycol added to the aqueous slurry for the formation of inorganic particle layers was changed to one having an average molecular weight of 1000 (product name "Polyethylene Glycol 1000" manufactured by Wako Pure Chemical Industries, Ltd.). The battery fabricated in this manner will be referred to as battery A2 hereinafter.

Example 3

A battery was fabricated in the same manner as in EXAMPLE 1, except that the polyethylene glycol added to the aqueous slurry for the formation of inorganic particle layers was changed to one having an average molecular weight of 6000 (product name "Polyethylene Glycol 6000" manufactured by Wako Pure Chemical Industries, Ltd.).

The battery fabricated in this manner will be referred to as battery A3 hereinafter.

Example 4

A battery was fabricated in the same manner as in EXAMPLE 1, except that the polyethylene glycol added to the aqueous slurry for the formation of inorganic particle layers was changed to one having an average molecular weight of 20000 (product name "Polyethylene Glycol 20000" manufactured by Wako Pure Chemical Industries, Ltd.).

The battery fabricated in this manner will be referred to as battery A4 hereinafter.

Example 5

A battery was fabricated in the same manner as in EXAMPLE 1, except that the polyethylene glycol added to the aqueous slurry for the formation of inorganic particle layers was changed to one having an average molecular weight of 500000 (product name "Polyethylene Glycol 500000" manufactured by Wako Pure Chemical Industries, Ltd.).

The battery fabricated in this manner will be referred to as battery A5 hereinafter.

Example 6

A battery was fabricated in the same manner as in EXAMPLE 1, except that the polyethylene glycol added to the aqueous slurry for the formation of inorganic particle layers was changed to one having an average molecular weight of 2000000 (product name "Polyethylene Glycol 2000000" manufactured by Wako Pure Chemical Industries, Ltd.).

The battery fabricated in this manner will be referred to as battery A6 hereinafter.

Comparative Example 1

A battery was fabricated in the same manner as in EXAMPLE 1, except that the polyethylene glycol was not added to the aqueous slurry for the formation of inorganic particle layers.

The battery fabricated in this manner will be referred to as battery Z1 hereinafter.

Comparative Example 2

A battery was fabricated in the same manner as in EXAMPLE 1, except that instead of the polyethylene glycol, ethylene glycol ("Ethylene Glycol" manufactured by Kishida Chemical Co., Ltd.) was added to the aqueous slurry for the formation of inorganic particle layers. The average molecular weight of this ethylene glycol was 62.

The battery fabricated in this manner will be referred to as battery Z2 hereinafter.

Comparative Example 3

A battery was fabricated in the same manner as in EXAMPLE 1, except that instead of the polyethylene glycol, diethylene glycol ("Diethylene Glycol" manufactured by Kishida Chemical Co., Ltd.) was added to the aqueous slurry for the formation of inorganic particle layers. The average molecular weight of this diethylene glycol was 106.

The battery fabricated in this manner will be referred to as battery Z3 hereinafter.

[Experiment 1]

The batteries A1 to A6 and Z1 to Z3 were tested and evaluated under the following conditions. The results are described in Table 1.

The batteries were charged to a final charge voltage of 4.40 V by 1 It constant current-constant voltage charging (final current 1/50 It) and their thickness was measured. After the measurement of thickness, the batteries were stored in an 80° C. thermostatic chamber for 2 days. The thickness was measured immediately after the batteries were removed from the thermostatic chamber. The thickness increase rate (%) was determined according to the following equation.

Thickness increase rate (%)=(thickness after storage/thickness before storage)×100−100

TABLE 1

| Batteries | Average molecular weights | Thickness increase rates (%) |
| --- | --- | --- |
| A1 | 200 | 31 |
| A2 | 1000 | 18 |
| A3 | 6000 | 25 |
| A4 | 20000 | 24 |
| A5 | 500000 | 29 |
| A6 | 2000000 | 26 |
| Z1 | — | 48 |
| Z2 | 62 | 44 |
| Z3 | 106 | 43 |

As clearly shown by the results in Table 1, the addition of polyethylene glycols having an average molecular weight of not less than 200 has been confirmed to reduce the thickness increase rate. The reason for this is probably that the polyethylene glycol groups present in the inorganic particle layers adsorbed a gas generated by the decomposition of the electrolytic solution at the surface of the positive electrode during the storage at high temperature.

Further, the results in Table 1 indicate that it is particularly preferable that the average molecular weight be not less than 1000 and not more than 20000.

The reasons for this are probably that if the average molecular weight is low, the capability of adsorbing the decomposition products from the electrolytic solution is lowered and the effects of the suppression of battery swelling are decreased, as well as that if the average molecular weight is excessively high, the solubility in a slurry solvent is decreased and consequently it becomes difficult for the compound to be spread uniformly on the surface of the positive electrode, thus deteriorating productivity.

Further, the results of COMPARATIVE EXAMPLES Z1 to Z3 in Table 1 illustrate that the ethylene glycol and the diethylene glycol disclosed in Japanese Published Unexamined Patent Application No. 2011-71047 have little effects in the suppression of swelling during storage.

INDUSTRIAL APPLICABILITY

The present invention is expected to be applied to, for example, power supplies for driving mobile information terminals such as mobile phones, notebook computers and PDAs, power supplies for driving high-output devices such as HEVs and electric tools, and capacitors in which the inventive batteries are combined with solar cells and power systems.

REFERENCE SIGNS LIST

1: POSITIVE ELECTRODE
2: NEGATIVE ELECTRODE
3: SEPARATOR
4: POSITIVE ELECTRODE CURRENT COLLECTING TAB
5: NEGATIVE ELECTRODE CURRENT COLLECTING TAB
6: ALUMINUM LAMINATE EXTERIOR CASE

The invention claimed is:

1. A nonaqueous electrolyte secondary battery comprising a positive electrode including a positive electrode active material, a negative electrode including a negative electrode active material, a nonaqueous electrolyte, and a separator disposed between the positive electrode and the negative electrode, the nonaqueous electrolyte secondary battery comprising an inorganic particle layer disposed between the positive electrode and the separator, wherein the inorganic particle layer comprises a binder, a polymer with a polyethylene glycol group and an inorganic particle, and the polymer with a polyethylene glycol group has an average molecular weight of not less than 200.

2. The nonaqueous electrolyte secondary battery according to claim 1, wherein the polymer with a polyethylene glycol group present in the inorganic particle layer has an average molecular weight of not less than 200 and not more than 2000000.

3. The nonaqueous electrolyte secondary battery according to claim 1, wherein the polymer with a polyethylene glycol group present in the inorganic particle layer is a polyethylene glycol.

4. The nonaqueous electrolyte secondary battery according to claim 1, wherein the polymer with a polyethylene glycol group present in the inorganic particle layer consists essentially of a polyethylene glycol.

5. The nonaqueous electrolyte secondary battery according to claim 1, wherein the inorganic particle layer is disposed on the surface of the positive electrode.

6. The nonaqueous electrolyte secondary battery according to claim 1, wherein inorganic particles present in the inorganic particle layer are particles of at least one selected from rutile-type titania or alumina.

7. The nonaqueous electrolyte secondary battery according to claim 1,
wherein the negative electrode active material is selected from the group consisting of a carbon material, silicon, tin, silicon alloy, tin alloy, silicon oxide, tin oxide and mixtures thereof.

8. The nonaqueous electrolyte secondary battery according to claim 1,
wherein the polymer with a polyethylene glycol present in the inorganic particle layer is a polyethylene glycol having a molecular weight of not less than 1000 and not more than 20000.

9. The nonaqueous electrolyte secondary battery according to claim 1, wherein the inorganic particle layer comprises a binder, a polymer with a polyethlene glycol group, a dispersing agent and an inorganic particle.

10. The nonaqueous electrolyte secondary battery according to claim 9, wherein the inorganic particle layer consists essentially of a binder, a polymer with a polyethlene glycol group, a dispersing agent and an inorganic particle.

11. The nonaqueous electrolyte secondary battery according to claim 1, wherein the inorganic particle layer comprises a binder, a polyethlene glycol, a dispersing agent and an inorganic particle.

12. The nonaqueous electrolyte secondary battery according to claim 11, wherein the inorganic particle layer consists essentially of a binder, a polyethylene glycol, a dispersing agent and an inorganic particle.

13. The nonaqueous electrolyte secondary battery according to claim 1, wherein the inorganic particle layer comprises SBR, a polyethlene glycol and an inorganic particle.

14. The nonaqueous electrolyte secondary battery according to claim 13, wherein the inorganic particle layer comprises SBR, a polyethylene glycol, CMC and an inorganic particle.

15. The nonaqueous electrolyte secondary battery according to claim 14, wherein the inorganic particle layer consists essentially of SBR, a polyethylene glycol, CMC and an inorganic particle.

* * * * *